United States Patent
Niemela et al.

(10) Patent No.: US 9,774,601 B2
(45) Date of Patent: Sep. 26, 2017

(54) SECURITY OF COMPUTER RESOURCES

(71) Applicant: F-Secure Corporation, Helsinki (FI)

(72) Inventors: Jarno Niemela, Kirkkonummi (FI); Erka Koivunen, Helsinki (FI)

(73) Assignee: F-Secure Corporation, Helsinki (FI)

( * ) Notice: Subject to any disclaimer, the term of this patent is extended or adjusted under 35 U.S.C. 154(b) by 0 days.

(21) Appl. No.: 15/353,108

(22) Filed: Nov. 16, 2016

(65) Prior Publication Data

US 2017/0149787 A1    May 25, 2017

(30) Foreign Application Priority Data

Nov. 19, 2015  (GB) .................................. 1520403.5

(51) Int. Cl.
*H04L 29/06* (2006.01)
*G06F 21/62* (2013.01)
*G06F 21/55* (2013.01)

(52) U.S. Cl.
CPC ............ *H04L 63/10* (2013.01); *G06F 21/552* (2013.01); *G06F 21/6218* (2013.01); *H04L 63/145* (2013.01)

(58) Field of Classification Search
CPC ...... H04L 63/10; H04L 63/145; G06F 21/552
USPC ......................................................... 726/23
See application file for complete search history.

(56) References Cited

U.S. PATENT DOCUMENTS

| 7,814,544 | B1 | 10/2010 | Wilhelm | 726/22 |
| 2007/0174697 | A1* | 7/2007 | Saridakis | G06F 11/1471 714/19 |
| 2009/0199296 | A1* | 8/2009 | Xie | G06F 21/316 726/23 |
| 2014/0259130 | A1* | 9/2014 | Li | G06F 21/31 726/6 |
| 2015/0172305 | A1* | 6/2015 | Dixon | G06F 21/53 726/23 |
| 2015/0248554 | A1 | 9/2015 | Dumitru et al. | |

FOREIGN PATENT DOCUMENTS

EP    2 887 612 A1    6/2015

* cited by examiner

*Primary Examiner* — Dao Ho
(74) *Attorney, Agent, or Firm* — Harrington & Smith (57) ABSTRACT

Embodiments of the invention relate to improving security of computer resources. According to an aspect, providing access to a reference database storing information on known behavior of trusted computer processes and on resources the trusted computer processes need from a configuration database, the configuration database stores configuration information of a computer network; detecting, by a first computer process from a second computer process, a request for specified resource of the configuration database; determining, based on the request and the reference database, whether the second computer process is known to need the requested resource; upon determining that the computer process is not known to need the requested resource, causing a response to the request indicating to the second computer process that the response includes the requested resource but wherein the response comprises a resource indicator that directs the second computer process to access an environment monitored by an anti-malware computer process.

17 Claims, 4 Drawing Sheets

SECURITY OF COMPUTER RESOURCES

FIELD

The invention relates to the field of computer security and, particularly, protecting computer resources from malware attacks.

BACKGROUND

Computer viruses and malicious software (called malware) have existed for decades in a desktop computing environment. Some malware target network configuration databases and search for information on entities that contain or control sensitive resources, e.g. e-mail servers or domain controllers. Upon retrieving such information, the malware may target the entities and try to gain access to the sensitive resources. So-called honeypots have been used to detect such an unauthorised access to the information. A honeypot appears to be a legitimate entity controlling the sensitive resources but is actually an isolated entity monitored by an anti-malware tool. However, some malware are able to avoid the honeypots. Therefore, improvements to the computer security are needed.

BRIEF DESCRIPTION

According to an aspect, there is provided a method for improving security of computer resources, comprising in an apparatus: providing access to a reference database storing information on known behaviour of trusted computer processes and on resources the trusted computer processes need from a configuration database, wherein the configuration database stores information on a configuration of a computer network; detecting, by a first computer process from a second computer process, a request for a specified resource stored in the configuration database; determining, by the first computer process on the basis of the request and the reference database, whether or not the second computer process is known to need the requested resource; upon determining that the computer process is not known to need the requested resource, causing transmission of a response to the request, wherein the response indicates to the second computer process that the response includes the requested resource but wherein the response comprises a resource indicator that directs the second computer process to access an environment monitored by an anti-malware computer process.

According to another aspect, there is provided an apparatus comprising a processing system configured to: access a reference database storing information on known behaviour of trusted computer processes and on resources the trusted computer processes need from a configuration database, wherein the configuration database stores information on a configuration of a computer network; detect, in a first computer process from a second computer process, a request for specified resource stored in the configuration database; determine, in the first computer process on the basis of the request and the reference database, whether or not the second computer process is known to need the requested resource; upon determining that the computer process is not known to need the requested resource, causing transmission of a response to the request, wherein the response indicates to the second computer process that the response includes the requested resource but wherein the response comprises a resource indicator that directs the second computer process to access an environment monitored by an anti-malware computer process.

According to yet another aspect, there is provided a computer program product embodied on a non-transitory distribution medium readable by a computer and comprising program instructions which, when loaded into a computer, execute a method for improving security of computer resources, comprising in the computer: providing access to a reference database storing information on known behaviour of trusted computer processes and on resources the trusted computer processes need from a configuration database, wherein the configuration database stores information on a configuration of a computer network; detecting, by a first computer process from a second computer process, a request for a specified resource stored in the configuration database; determining, by the first computer process on the basis of the request and the reference database, whether or not the second computer process is known to need the requested resource; upon determining that the computer process is not known to need the requested resource, causing transmission of a response to the request, wherein the response indicates to the second computer process that the response includes the requested resource but wherein the response comprises a resource indicator that directs the second computer process to access an environment monitored by an anti-malware computer process.

Embodiments of the invention are defined in the dependent claims.

LIST OF DRAWINGS

Embodiments of the present invention are described below, by way of example only, with reference to the accompanying drawings, in which.

DESCRIPTION OF EMBODIMENTS

The following embodiments are exemplary. Although the specification may refer to "an", "one", or "some" embodiment(s) in several locations, this does not necessarily mean that each such reference is to the same embodiment(s), or that the feature only applies to a single embodiment. Single features of different embodiments may also be combined to provide other embodiments. Furthermore, words "comprising" and "including" should be understood as not limiting the described embodiments to consist of only those features that have been mentioned and such embodiments may contain also features/structures that have not been specifically mentioned.

Figure 1:
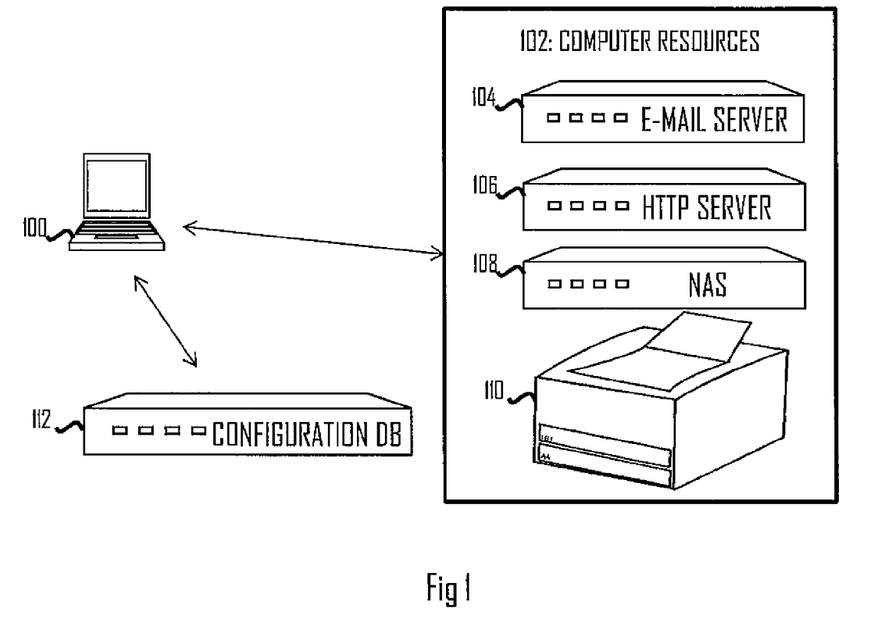
FIG. 1 illustrates a computer environment to which embodiments of the invention may be applied.

FIG. 1 illustrates a computing environment to which embodiments of the invention may be applied. Referring to FIG. 1, the computing environment comprises a set of computer resources 102 that may form a computer configuration of a corporate network, for example. The computer resources of the computer network may comprise a set of computer resources realized by a plurality of devices. The devices may comprise server computers such as an e-mail server 104, an Internet browser server 106, a network-accessed storage 108 storing various databases and/or directories for various files, at least one printer device 110, etc. The resources of the network may be accessible to at least authorized users of the network. The authorization of the users may be realized through user credentials, e.g. a user name and an associated password. The resources may store confidential or sensitive information or control operation of vital operations in the network.

The authorized users may access the resources with a client computer 100 such as a personal computing device. The personal computing device 100 may be a personal computer, a desktop computer, a laptop, a workstation, or a tablet computer. The personal computing device 100 may comprise a processing system comprising at least one processor and at least one memory storing a computer program code controlling the operation of the at least one processor. The user may use the personal computing device 100 to execute various computer processes of computer program applications, wherein at least some of the processes may require access to the resources 102. The processes may be legitimate processes part of regular operation and use of the computer network and the resources 102.

The computer network may comprise a configuration database 112 storing information on a configuration of the computer network. The configuration database 112 may store information on identities of the resources 102, e.g. addresses or domain names of the resources 102. As a consequence, the configuration database 112 may provide information on a name and/or network address of the servers 104, 106, databases 108, and other devices 110 of the network. The configuration database may further manage user credentials of the authorized users, e.g. store user accounts and associated user names and passwords, user groups, and access rights of the user accounts and the user groups to the resources 102. For example, a user logging in to the computer network may be subjected to providing a user name and a password to the client computer 100, and the client computer 100 provides the user credentials to a server of the computer network, wherein the server cross-references the credentials with the corresponding credentials in the configuration database 112 and either allows or rejects access to the computer resources.

An embodiment of the configuration database 112 is Active Directory of Microsoft® Windows Server® system. Another embodiment of the configuration database 112 is Satellite used in Linux® servers. It should be appreciated that each database is merely an embodiment of the configuration database used in the description of the present invention provided below. In general, the embodiments of the invention are applicable to any database managing and storing information on the configuration of the computer network, domains of the computer network, user accounts and user credentials, contact details such as e-mail addresses, domain names of a domain name system (DNS), etc. For example, the configuration database may be under a control of a server such as a light-weight directory access protocol (LDAP) server or a DNS server.

It has been discovered that some malware is designed to attempt access to the configuration database such as the Active Directory and attempt retrieval of the network addresses of vital computer resources in the computer network. The access to the configuration database may be possible if the malware has successfully captured user credentials, for example, and attempts access to the configuration database as an independent computer process. Another example is that the malware has captured a legitimate computer process executed in the client computer 100 or even in a device of the computer resources 102 and uses the computer process to access the configuration database 112 with malicious incentives. In a conventional situation, a malware that has already penetrated the security measures may gain access to the configuration database and to the information on the vital or sensitive computer resources of the computer network. Upon gaining such information, the malware may target its attacks to such resources.

Figure 2:
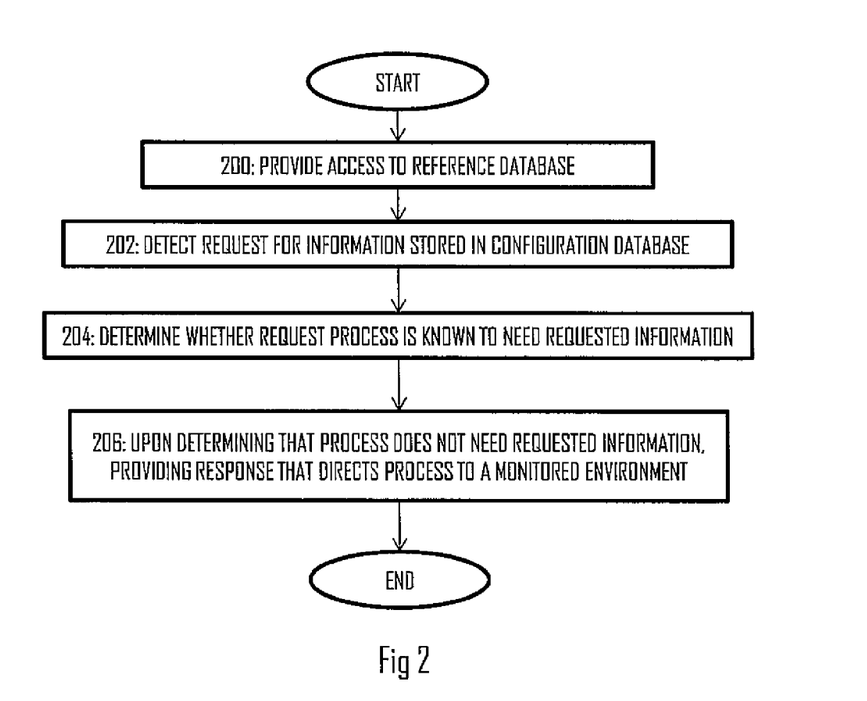
FIG. 2 illustrates a process for screening a suspicious computer process according to an embodiment of the invention.

FIG. 2 illustrates an embodiment designed to deflect such malicious access attempts to the configuration database 112. Referring to FIG. 2, a first computer process executed by a processing system comprising at least one processor comprises: providing (block 200) access to a reference database storing information on known behaviour of trusted computer processes and on resources the trusted computer processes need from a configuration database 112. The configuration database 112 may manage information on a configuration of a computer network; detecting (block 202), by the first computer process from a second computer process, a request for a specified resource stored in the configuration database 112; determining (block 204), by the first computer process on the basis of the request and the reference database, whether or not the second computer process is known to need the requested resource; upon determining that the computer process is not known to need the requested resource, causing (block 206) transmission of a response to the request, wherein the response indicates to the second computer process that the response includes the requested resource but wherein the response comprises a resource indicator that directs the second computer process to access an environment monitored by an anti-malware computer process.

The first computer process is thus capable of detecting whether or not the second computer process is requesting for information or a resource for which it should have access. Thus, legitimate processes may gain the information they need in their normal operation. However, if the second computer process is requesting for information or a resource that is not known to be needed by the second computer program application, the first computer process may manipulate the response such that, instead of the correct information, the second computer process is provided with faked information that directs the second computer process to access a secured environment where the behaviour of the second computer process is monitored by the anti-malware computer process. The environment may be isolated from the real operation of the computer network and it may be defined as a virtual environment. In such an environment, the anti-malware computer process may monitor how the second computer process uses the provided information. If the second computer process attempts the gain control of the computer resource for malicious purposes or to read, modify, or delete sensitive information, the anti-malware process may quarantine or even kill the process and store a record about the detected malware. Accordingly, the embodiment of FIG. 2 improves the security of the computer network by directing suspicious computer processes to the monitored environment for further analysis.

In an embodiment, the environment to which the second computer process is directed access is not an isolated environment but a real, non-virtual location in the computer network. For example, the second computer process may be directed to access a resource that is a real resource in the computer network but the manner in which the resource is used is monitored by the anti-malware computer process. In another embodiment, the second computer process may be directed to a resource that does not exist in the computer network, e.g. the resource may be a fake file, fake e-mail address, fake domain name, or a fake proxy server address. The anti-malware process may then monitor the second process and determine whether or not the second process attempts to carry out malicious of the fake resource, e.g. by attempting to send spam e-mail to the fake e-mail address or deleting the fake file.

In an embodiment, the environment to which the second computer process is directed to access is called a honeypot commonly used in the field of computer security. As described in the Background, the honeypot may appear as a legitimate resource of entity to the second computer process but may be actually the environment monitored and created by the anti-malware computer process and isolated from the real operation of the computer network.

In an embodiment, if the anti-malware process detects, on the basis of the monitoring in the secured environment, that the second computer process has no malicious purposes, it may release the second computer process after which the first computer process may provide the second computer process with the response that contains the requested information as unmodified.

Figure 3:
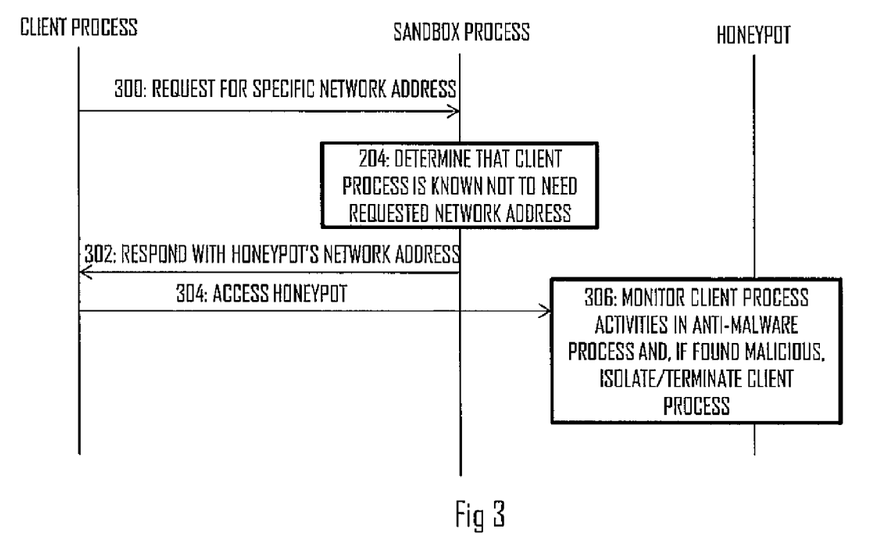
FIGS. 3 and 4 illustrate signalling diagrams of computer processes screening a suspicious client process according to some embodiments of the invention.
Figure 4:
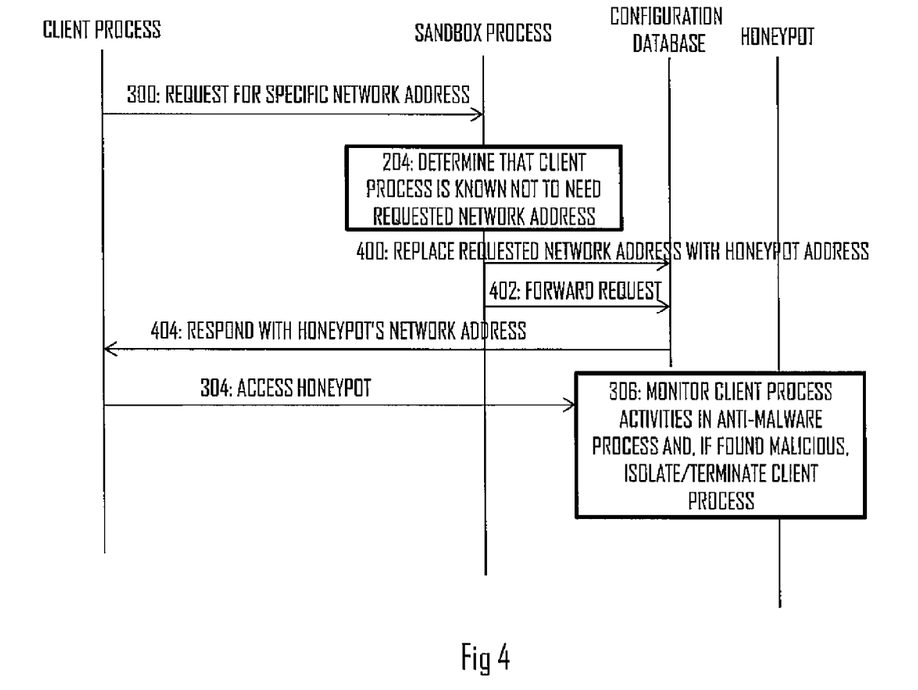

Let us now describe some embodiments of the procedure of FIG. 2 with reference to signalling diagrams of FIGS. 3 and 4. FIG. 3 illustrates exchange of messages between a client process (the above-described second process) and a sandbox process (the above-described first process). The client process may be executed in the same physical device as the sandbox process, or the processes may be executed in physically separate devices.

Referring to FIG. 3, the client process makes in step 300 a request for a specific resource stored in the configuration database 112. In this embodiment, the resource specified in the request of step 300 is a request for a network address of a specified network entity, e.g. a network address of an e-mail server or more generally a network address of a requested domain name. The network address may refer to an internet protocol (IP) address. The sandbox process is configured to capture any requests directed to the configuration database and, as a consequence, the sandbox process captures the request in step 300 before the request reaches the configuration database. Upon receiving or detecting the request in step 300, the sandbox process may carry out block 204 described above. The sandbox process may identify the client process and check the reference database for the identified client process. The checking may comprise determining contents of the configuration database that the client process is known to need in its normal operation. Upon determining that the reference database indicates that the client process does not need the requested resource, e.g. the requested network address, as a part of its normal operation, the sandbox process may generate a response message comprising a network address of a honeypot. As described above, the honeypot may refer to a network address of an isolated environment monitored by the anti-malware process. For example, if the client process is a clock application, it does not probably need access to access an e-mail server. As another example, a hypertext transfer protocol server process attempting access to an e-mail server may be considered suspicious behaviour by the sandbox process and, thus, be directed to the honeypot.

In other implementations, the honeypot may be a real resource of the computer network but under the monitoring of the anti-malware computer process. The honeypot may refer to a resource that is not accessed by any one of the legitimate computer processes executed in the computer network. Thus, it may be considered as a resource designed to be accessed only by malware. In general, the honeypot may refer to a process or a device configured to monitor and record any access or action directed to the monitored resource. Such an access or action may comprise attempts to read, modify, write, or delete the computer resource.

In step 302, the sandbox sends the response with the honeypot address to the client process. As the client process has requested for the specific network address in step 300 and receives a response to the request in step 302 that includes a network address, the client process may be under the assumption that the received network address is the requested network address. As a consequence, the client process accesses the received network address in step 304. Instead of the requested network domain or site, the client process is directed to the honeypot where the anti-malware process monitors the operational code of the client process in the secured environment (block 306). If the operational code or activities of the client process are found malicious, the anti-malware process may quarantine or terminate the client process in block 306. On the other hand, if the anti-malware process finds the client process to perform legitimate functions, the anti-malware process indicate to the sandbox process that the client process was found legitimate, and the sandbox process may update the reference database to indicate that the client process needs the network address requested in step 300 during its normal operation. The sandbox process may then provide the client process with the requested network address whenever the client process requests for the network address (or the specified resource in general).

FIG. 3 illustrates an embodiment where the sandbox process is provided between the configuration database and the client processes and where the sandbox process generates responses to the requests without modifying the actual contents of the configuration database. This has the advantage that the configuration database does not need constant modification and remodification. This may be advantageous in cases where the configuration database is maintained in a plurality of separate locations, e.g. on different servers, and the configuration databases are synchronized in real-time. Such databases may be designed for numerous read operations but only for occasional update operations.

Upon determining in response to detecting the request in step 300 that the client process needs the requested resource as a part of its normal operation, the sandbox process may access the configuration database, retrieve the requested resource from the configuration database, and send the requested resource to the client process.

FIG. 4 illustrates an embodiment where the sandbox process modifies the contents of the configuration database before the response is sent to the client process. In FIG. 4, the steps or blocks denoted with the same reference numbers as in previous Figures represent the same or substantially similar operations. Upon receiving the request in step 300 and determining that the reference database indicates that the client process does not need the requested resource as the part of its normal operation, the sandbox process may access the configuration database, replace the requested resource, e.g. the requested network address, with a resource directing the client process to the honeypot (step 400). The sandbox process may hold the request 300 for the duration of the check in block 204 and the modification in step 400. After the modification of the configuration database has been completed, the sandbox process may release the request and forward the request to the configuration database (step 402). Accordingly, the client process receives the honeypot's address from the configuration database in step 404. After step 404, the sandbox process may revert the configuration database to a form it had before step 400, e.g. the sandbox process may return the original value of the requested resource in the configuration database. Since the client process received the honeypot's address as a response to the request of step 300, it accesses the honeypot in step 304 and enters the environment monitored by the anti-malware process (block 306).

The processes described above may be used to direct suspicious processes or even known processes performing suspicious operations to the further analysis by the anti-malware process. The sandbox process may thus be considered as a screening process that screens suspicious processes and directs them to the further analysis. The anti-malware computer process may then make the decision of whether or not the process is malicious. The sandbox process may be executed in the real domain and process real requests to the real configuration database. The process is directed to the virtual or isolated environment by the sandbox process after the sandbox process has detected the suspicious resource request. As a consequence, the sandbox process may be a part of real operation of the computer network in which the processes are provided with real services such as Microsoft® Internet Information Services or Apache web service.

Figure 5:
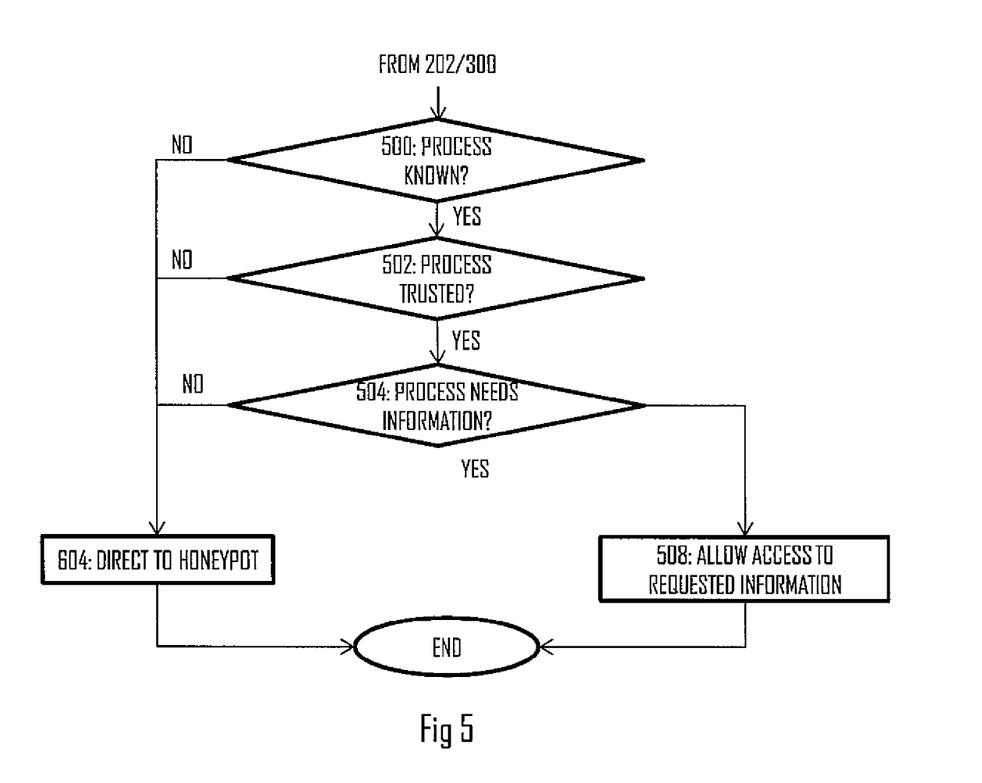
FIG. 5 illustrates some embodiments of criteria for directing a computer process to a honeypot.

FIG. 5 illustrates an embodiment of the sandbox process and, in particular, some criteria for the sandbox process to direct the client process to the honeypot (block 604). It should be appreciated that the sandbox process may use all the criteria or a subset of the criteria described in connection with FIG. 5. In such a case, the process may proceed to block 508 from either block 502 or 500. Referring to FIG. 5, the sandbox process may, upon detecting the client process requesting for the specific resource from the configuration database in block 200 or step 300, carry out block 500. In block 500, the sandbox process may determine from the reference database whether or not the client process is a process known in the computer network or a computer system. If the client process is an unknown process, e.g. it is not included in the reference database, the sandbox process may direct the client process to the honeypot (block 604). The motivation may be that an unknown process is not desirable to gain access to vital information on the computer network or confidential information.

If the process is a known process, the process of FIG. 5 may proceed to block 502 in which the sandbox process determines, on the basis of the reference database, whether or not the known client process is trusted. If the process is determined to be entrusted or its trust level is unknown, the sandbox process may direct the client process to the honeypot (block 604). On the other hand, if the client process as such is trusted and, thus, found a legitimate process in the computer network, the process may proceed to block 504. In block 504, the sandbox process determines, on the basis of the reference database, whether or not the client process needs the requested resource in its normal, legitimate operation. If the reference database indicates that the client process is requesting for a resource not needed in its normal operation, the client process is potentially corrupted by malware and, as a consequence, the sandbox process may direct the client process to the honeypot (block 604). Otherwise, the client process may be allowed to access the configuration database (block 508).

The decision of whether or not to direct the client process to the honeypot from any one of blocks 500, 502, 504 may further be subjected to what type of information the client process is requesting. If the client process is determined to request for sensitive contents such as confidential information or an address of a vital controller of the computer network, the client process may be directed to the honeypot. For example, an unknown process attempting access to an e-mail server or to a Microsoft® SharePoint server may be directed to the honeypot by default. On the other hand, if the process is requesting for information that is considered not to be harmful to distribute to any process, the sandbox process may provide the client process with the requested information. The classification between such sensitive information and distributable information may be defined and stored in the reference database.

The reference database may be constructed by observing normal operation of legitimate processes executed in the computer network and determining what type of information stored in the configuration database is needed by the legitimate processes. Such information may alternatively be readily available in a cloud service, for example.

Figure 6:
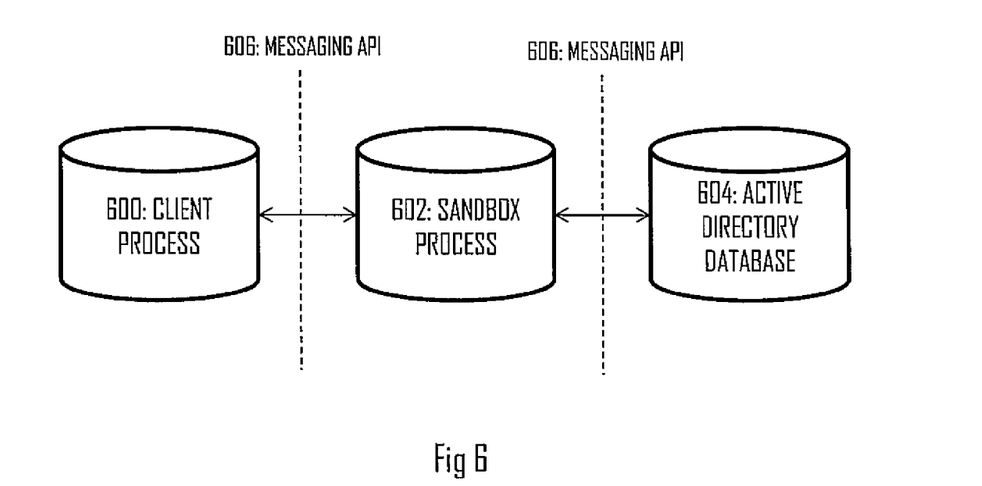
FIGS. 6 and 7 illustrate embodiments of systems where some embodiments of the invention may be carried out.

Let us now describe some embodiments of a device executing the sandbox process. FIG. 6 illustrates an embodiment where the client process and the sandbox process are executed in the same physical device such as a computer or even a processor. In such a case, the sandbox process 602 may be hooked with an application programming interface (API) between the client process 600 and the configuration database 112. In this embodiment, the configuration database may be the active directory database 604 of Microsoft® or another configuration database. The API to which the sandbox process is hooked may be a messaging API or a Lightweight Directory Access Protocol API, for example. Referring to FIG. 6, the client process may send the request of step 300 to the API 606 and, since the sandbox process 602 is operating in the API, the sandbox process 602 may capture the request before it reaches the configuration database 112, 604.

Figure 7:
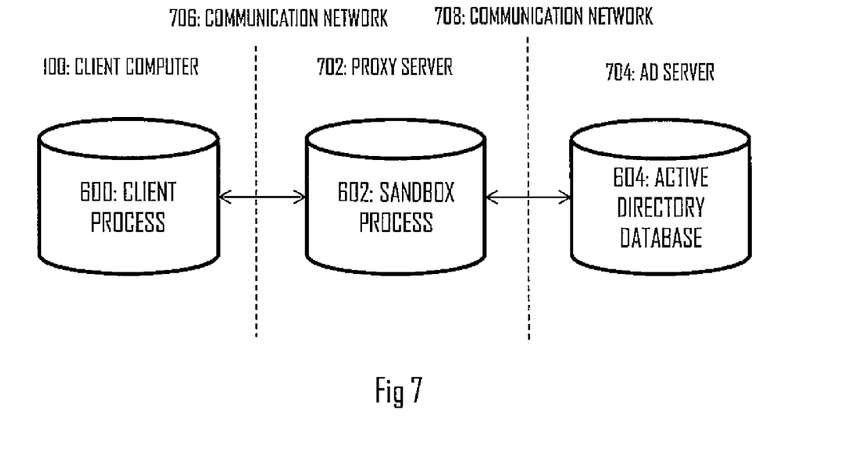

FIG. 7 illustrates an embodiment where the sandbox process 602 and the client process 600 are executed in physically separate devices. For example, the client process may be executed in the client computer 100 while the sandbox process 602 may be executed in a proxy server 702 provided between the client computer 100 and a server storing the configuration database, e.g. an active directory server 704 storing the Microsoft® Active Directory database 604. In this case, the client process 600 may send the request of step 300 to the configuration database over at least one communication network. A first communication network may be between the proxy server 702 and the client computer 100 on the route from the client computer 100 to the server 704. Accordingly, the sandbox process may capture the request of step 300 before it reaches the configuration database 112, 604. A second communication network 708 may be provided between the proxy server 702 and the server 704 so that the sandbox process 602 may forward the request to the configuration database, if the request has been determined to be legitimate and allowable.

The computer network may comprise a plurality of entities that manage contents of the configuration database. For example, the management of the configuration database may be distributed to multiple servers. In the context of the Microsoft® Active Directory, the servers managing the Active Directory may be indicated under a domain name _msdcs.DOMAIN_NAME. The sandbox process may be hooked to the operation of at least a subset of these entities managing the configuration database or even to all of them.

Figure 8:
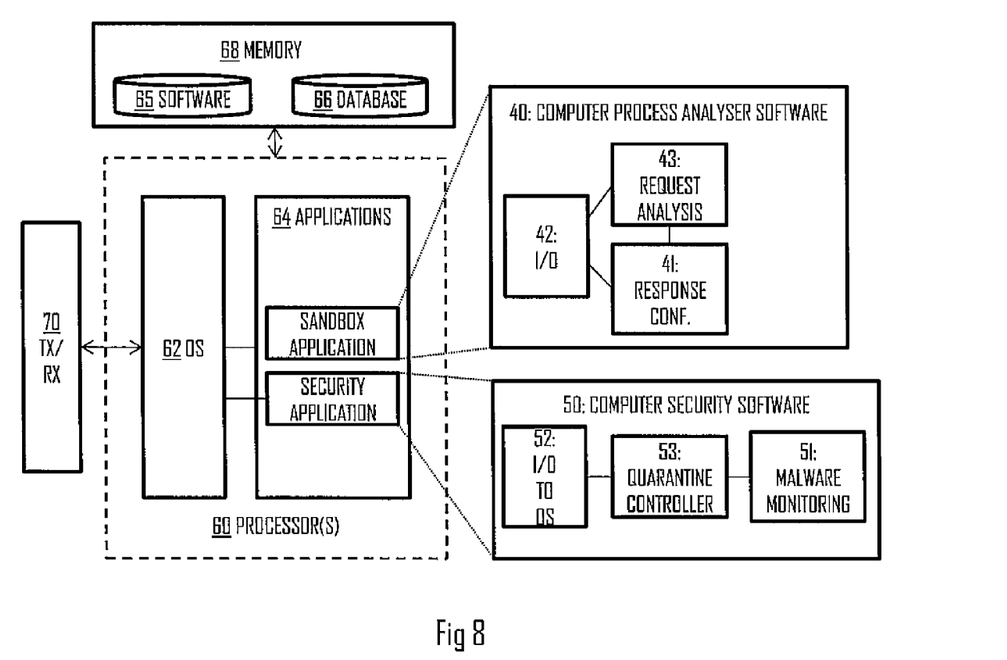
FIG. 8 is a block diagram illustrating a structure of an apparatus according to an embodiment of the invention.

FIG. 8 illustrates a block diagram of an embodiment of an apparatus for carrying out the embodiments described above. The apparatus may be comprised in the client computer 100 or in a server computer of the computer network. The apparatus may comprise a processing system configured or arranged to carry out computer security functions such as the above-described first computer process. The processing system may comprise at least one processor 60 and at least one memory 68 including a computer program code 65, wherein the at least one memory 68 and the computer program code 65 are configured, with the at least one processor 60, to cause the apparatus to carry out the above-described embodiments of the first computer process, e.g. the sandbox process.

The processing system may refer to any one of the following: (a) a hardware-only circuit implementation such as an implementation in only analogue and/or digital circuitry; (b) a combination of hardware circuitry and software and/or firmware, such as (as applicable): (i) a combination of processor(s) or processor cores; or (ii) portions of processor(s)/software including digital signal processor(s), software, and at least one memory that work together to cause the apparatus to perform specific functions; and (c) circuits, such as a microprocessor(s) or a portion of a microprocessor(s), that require software or firmware for operation, even if the software or firmware is not physically present. The processing system may also cover an implementation of merely a processor (or multiple processors) or portion of a processor, e.g. one or multiple cores of a multi-core processor, and its (or their) accompanying software and/or firmware. The term processing system would also cover, for example, an integrated circuit, an application-specific integrated circuit (ASIC), and/or a field-programmable grid array (FPGA) circuit for the apparatus according to an embodiment of the invention.

Referring to FIG. 8, the processor 60 may be configured to execute an operating system (OS) 62. The operating system may be a Windows-based OS such as Windows 7, Windows 8, Windows 10, Windows Server OS, Linux OS, or Unix OS. As known in the art, the operating system 62 manages hardware resources, e.g. the processor(s) 60 and provides services to applications 64 executed in a computer. The services may be provided through one or more APIs that serve as an interface between the applications 64 and the operating system 62. The applications 64 may comprise any known computer program applications including security applications, gaming and/or utility applications, office applications, professional applications related to any professional field, a web browser, etc. Regarding the present invention, the applications 64 may comprise an application executing the first computer process, e.g. the sandbox process. In FIG. 8, the application is called sandbox application. The security application may execute the above-described anti-malware computer process.

The apparatus may further comprise or be connected to a communication interface 70 comprising hardware and/or software for realizing a communication connectivity according to one or more communication protocols. The communication interface 70 may comprise components providing the apparatus with wired communication capability, e.g. according to Ethernet communication protocol. The communication interface 70 may comprise components providing the apparatus with wireless communication capability, e.g. the communication interface 70 may comprise radio interface components providing radio communication capability. The operating system 62 may configure the communication interface 70 to provide a connection to the computer resources 102, e.g. the servers of the computer network.

The security application 50 may comprise an anti-virus and/or anti-malware engine, a firewall, a network traffic monitor, etc. for tracking any known attack vector to prevent a virus, worm, or malware from accessing the apparatus and/or operating in the apparatus. The security application 50 may also provide the above-described functionality for providing the isolated environment where behaviour of a computer process may be monitored without causing any damage or risk for the legitimate processes and vital information stored in the computer network. Referring to FIG. 8, the security application 50 may comprise an interface 52 to the operating system 62. The interface 52 may be a software interface, and it may be used to monitor instructions executed by the operating system 62, APIs, etc. The interface 52 may further be used to access a reputation database in order to retrieve references of suspicious behaviour of monitored computer processes. The security application 50 may comprise a malware monitoring module 51 configured to monitor the functions carried out by the monitored process. Upon detecting that the monitored process is performing suspiciously, the malware monitoring module 51 may call a quarantine module 53 configured to restrict the operation of the identified computer process and associated application. The quarantine module 53 may prevent further actions by the application, quarantine the application or delete the application. The security application may further output a notification through a display unit of the apparatus that a potentially harmful application has been detected and removed.

The security software application may be a self-sustained application able to detect and quarantine any viruses, attack vectors, and malware autonomously, or it may contact a security server for instructions or virus/malware definitions upon detecting suspicious content or a possible attack vector. The attack vector may be defined as a path or means by which a hacker (or cracker) attempts to gain access to the personal computing system or to a network server in order to deliver a payload or malicious outcome. Attack vectors enable hackers to exploit system vulnerabilities, including the human element. The attack vector may carry a payload comprising a virus, a malicious web page, a pop-up window, or any other malicious or inconvenient content.

The apparatus may further comprise the user interface comprising a display unit, an input device, etc. The user interface may comprise a touch-sensitive display, one or more hard buttons, etc.

The sandbox application may comprise a computer process analyser software 40 comprising an interface 42 to the operating system 62. The interface 42 may be a software interface, and it may be used to monitor messages transferred over an API of the operating system 62. The interface 52 may further be used to access the reference database 66 in order to retrieve information on the processes requesting for information from the configuration database 112. The software 40 may further comprise a request analysis module 43 configured to receive the request of the second computer process or the client computer process, to access the reference database 66 and determine whether or not the request specifies information needed by the requesting process in its normal operation. On the basis of said determining, the request analysis module may instruct a response configuration module 41 to generate a response to the request. As described above, the response configuration module 41 may generate a response directing the requesting process to the honeypot monitored by the computer security software 50 or to the requested resource, depending on the input from the request analysis module 43. Then, the response configuration module may output the generated response to the requesting process through the interface and, in the embodiment of FIG. 7, through the communication interface 70.

The processes or methods described in FIGS. 2 to 5 may also be carried out in the form of a computer process defined by a computer program. The computer program may be in source code form, object code form, or in some intermediate form, and it may be stored in some sort of carrier, which may be any entity or device capable of carrying the program. Such carriers include transitory and/or non-transitory computer media, e.g. a record medium, computer memory, read-only memory, electrical carrier signal, telecommunications signal, and software distribution package. Depending on the processing power needed, the computer program may be executed in a single electronic digital processing unit or it may be distributed amongst a number of processing units.

The present invention is applicable to apparatuses defined above but also to other suitable systems or computer networks. The specifications of the systems develop rapidly and such development may require extra changes to the described embodiments. Therefore, all words and expressions should be interpreted broadly and they are intended to illustrate, not to restrict, the embodiment. It will be obvious to a person skilled in the art that, as technology advances, the inventive concept can be implemented in various ways. The invention and its embodiments are not limited to the examples described above but may vary within the scope of the claims.

The invention claimed is:

1. A method for improving security of computer resources, comprising in an apparatus:
providing, by a device of a computer network, access to a reference database storing information of known behaviours of trusted computer processes and access to a configuration database storing resources the trusted computer processes are known to need from the configuration database, wherein the configuration database stores resources comprising information of a configuration of the computer network;
detecting, by a first computer process from a second computer process, a request for a specified resource of the resources stored in the configuration database, wherein the first computer process comprises a sandbox process and the second computer process comprises a client process, wherein the specified resource comprises a network address, and wherein the configuration database manages at least one of credentials to user accounts of the computer network and computer resources of the computer network;
determining, by the first computer process on a basis of the specified resource as requested and the known behaviours of the reference database, that the second computer process is not known to need the requested specified resource;
based on determining that the second computer process is not known to need the requested specified resource, causing transmission of a response to the request, wherein the response indicates to the second computer process that the response includes the requested specified resource, but wherein the response comprises a resource indicator that directs the second computer process to access a restricted environment monitored by an anti-malware computer process, wherein the first computer process modifies the configuration database by replacing the requested specified resource by the resource indicator at least for the duration of generating and transmitting the response and reverts the configuration database after the response to the second computer process has been transmitted.

2. The method of claim 1, further comprising:
detecting, on a basis of the reference database, that the second computer process is a trusted computer process but that the reference database indicates that the second computer process does not need the requested specified resource in a normal operation; and
determining, on a basis of said detecting, that the second computer process is potentially under a control of malware and, as a result of said determining, causing said transmission of the response that directs the second computer process to access the restricted environment monitored by the anti-malware computer process.

3. The method of claim 1, further comprising:
determining, on a basis of the reference database, whether or not the second computer process is a known process;
when the second computer process is an unknown computer process, causing said transmission of the response that directs the second computer process to access the restricted environment monitored by the anti-malware computer process.

4. The method of claim 1, wherein the first computer process is configured to be executed in an interface between the second computer process and the configuration database.

5. The method of claim 4, wherein the interface is an application programming interface.

6. The method of claim 4, wherein the first computer process is configured to be executed in a proxy server.

7. The method of claim 1, wherein the configuration database is an active directory database of a Windows Server operating system.

8. An apparatus of a computer network comprising a processing system, including at least one processor and accompanying software executed by the at least one processor, configured to:
access a reference database storing information on known behaviours of trusted computer processes and access to a configuration database storing resources the trusted computer processes are known to need from the configuration database, wherein the configuration database stores resources comprising information of a configuration of the computer network, and wherein the configuration database manages at least one of credentials to user accounts of the computer network and computer resources of the computer network;
detect, in a first computer process from a second computer process, a request for a specified resource of the resources stored in the configuration database, wherein the first computer process comprises a sandbox process and the second computer process comprises a client process, and wherein the specified resource comprises a network address;
determine, in the first computer process on a basis of the specified resource as requested and the known behaviours of the reference database, that the second computer process is not known to need the requested specified resource;
based on the determining that the second computer process is not known to need the requested specified resource, causing transmission of a response to the request, wherein the response indicates to the second computer process that the response includes the requested specified resource but wherein the response comprises a resource indicator that directs the second computer process to access a restricted environment monitored by an anti-malware computer process, wherein the first computer process modifies the configuration database by replacing the requested specified resource by the resource indicator at least for the duration of generating and transmitting the response and reverts the configuration database after the response to the second computer process has been transmitted.

9. The apparatus of claim 8, wherein the processing system is configured to generate, in the first computer process, the resource indicator without changing contents of the configuration database.

10. The apparatus of claim 8, wherein the processing system is configured to modify, in the first computer process, the configuration database by replacing the requested specified resource by the resource indicator at least for the duration of generating and transmitting the response and reverts the configuration database after the response to the second computer process has been transmitted.

11. The apparatus of claim 8, wherein the processing system is configured to:
 detect, on a basis of the reference database, that the second computer process is a trusted computer process but that the reference database indicates that the second computer process does not need the requested specified resource in a normal operation; and
 determine, on a basis of said detecting, that the second computer process is potentially under a control of malware and, as a result of said determining, causing said transmission of the response that directs the second computer process to access the restricted environment monitored by the anti-malware computer process.

12. The apparatus of claim 8, wherein the processing system is configured to:
 determine, on a basis of the reference database, whether or not the second computer process is a known process;
 when the second computer process is an unknown computer process, cause said transmission of the response that directs the second computer process to access the restricted environment monitored by the anti-malware computer process.

13. The apparatus of claim 8, wherein the processing system is configured to execute the first computer process in an interface between the second computer process and the configuration database.

14. The apparatus of claim 13, wherein the interface is an application programming interface.

15. The apparatus of claim 13, wherein the processing system is configured to execute the first computer process in a proxy server.

16. The apparatus of claim 8, wherein the configuration database is an active directory database of a Windows Server operating system.

17. A computer program product embodied on a non-transitory distribution medium readable by a computer and comprising program instructions which, when loaded into a computer, execute a method for improving security of computer resources, comprising in the computer:
 providing access in a computer network to a reference database storing information of known behaviour of trusted computer processes and access to a configuration database storing resources the trusted computer processes are known to need from the configuration database, wherein the configuration database stores resources comprising information of a configuration of the computer network, and wherein the configuration database manages at least one of credentials to user accounts of the computer network and computer resources of the computer network;
 detecting, by a first computer process from a second computer process, a request for a specified resource of the resources stored in the configuration database, wherein the first computer process comprises a sandbox process and the second computer process comprises a client process, and wherein the specified resource comprises a network address;
 determining, by the first computer process on a basis of the specified resource as requested and the known behaviours of the reference database, that the second computer process is not known to need the requested specified resource;
 based on determining that the computer process is not known to need the requested specified resource, causing transmission of a response to the request, wherein the response indicates to the second computer process that the response includes the requested specified resource but wherein the response comprises a resource indicator that directs the second computer process to access a restricted environment monitored by an anti-malware computer process, wherein the first computer process modifies the configuration database by replacing the requested specified resource by the resource indicator at least for the duration of generating and transmitting the response and reverts the configuration database after the response to the second computer process has been transmitted.

\* \* \* \* \*